United States Patent
Gouch

(10) Patent No.: US 12,222,485 B2
(45) Date of Patent: Feb. 11, 2025

(54) WHOLE SLIDE IMAGING METHOD FOR A MICROSCOPE

(71) Applicant: FFEI Limited, Hertfordshire (GB)

(72) Inventor: Martin Philip Gouch, Hertfordshire (GB)

(73) Assignee: VENTANA MEDICAL SYSTEMS, INC., Tuscon, AZ (US)

( * ) Notice: Subject to any disclaimer, the term of this patent is extended or adjusted under 35 U.S.C. 154(b) by 129 days.

(21) Appl. No.: 18/013,991

(22) PCT Filed: Jul. 6, 2021

(86) PCT No.: PCT/GB2021/051712
§ 371 (c)(1),
(2) Date: Dec. 30, 2022

(87) PCT Pub. No.: WO2022/018398
PCT Pub. Date: Jan. 27, 2022

(65) Prior Publication Data
US 2023/0288688 A1    Sep. 14, 2023

(30) Foreign Application Priority Data

Jul. 24, 2020  (GB) .................................. 2011475

(51) Int. Cl.
G02B 21/36   (2006.01)
G02B 21/00   (2006.01)
G06T 7/00    (2017.01)

(52) U.S. Cl.
CPC ..... *G02B 21/0036* (2013.01); *G02B 21/0072* (2013.01); *G02B 21/008* (2013.01);
(Continued)

(58) Field of Classification Search
None
See application file for complete search history.

(56) References Cited

U.S. PATENT DOCUMENTS 9,116,035 B2    8/2015  Gouch et al.
2005/0270638 A1  12/2005  Soenksen
(Continued)

FOREIGN PATENT DOCUMENTS

GB      2 416 442 A    1/2006
WO      99/47964 A1    9/1999
(Continued)

OTHER PUBLICATIONS

D. Wang, et al., "Comparison of line-scanned and point-scanned dual-axis confocal microscope performance", Optics Letters, Dec. 15, 2013, pp. 5280-5283, vol. 38, No. 24.
(Continued)

*Primary Examiner* — Eileen M Adams
(74) *Attorney, Agent, or Firm* — Sughrue Mion, PLLC

(57) ABSTRACT

A method is provided for operating a microscope scanner 1 comprising a line scanner 3. Pre-scan data is generated for a target 6 comprising a sample, wherein generating the pre-scan data comprises: obtaining a pre-scan image of the target 6 from a pre-scan; and identifying one or more sample-containing regions 24 and one or more sample-free regions 26 of the target 6 from the pre-scan image. An imaging scan is then performed of a scanning region of the target 6 including the one or more sample-containing regions 24 and the one or more sample-free regions 26. The scanning speed of the line scanner 3 is adjusted along the image scan path based on the pre-scan data so that the target 6 is imaged at a higher scanning speed within the one or more sample-free regions 26 than in the one or more sample-containing regions 24.

21 Claims, 4 Drawing Sheets

(52) U.S. Cl.
CPC ............... *G06T 7/0012* (2013.01); *G06T 2207/10061* (2013.01); *G06T 2207/10148* (2013.01); *G06T 2207/20212* (2013.01); *G06T 2207/30004* (2013.01)

(56) References Cited

U.S. PATENT DOCUMENTS

| | | | |
|---|---|---|---|
| 2007/0121200 A1 | 5/2007 | Suzuki et al. | |
| 2014/0168640 A1* | 6/2014 | Gouch | G01M 11/0257 356/123 |
| 2015/0054921 A1* | 2/2015 | Dixon | G02B 21/26 348/46 |
| 2017/0075101 A1* | 3/2017 | Hawes | G02B 21/367 |
| 2018/0246309 A1* | 8/2018 | Brown | H04N 1/17 |

FOREIGN PATENT DOCUMENTS

| | | |
|---|---|---|
| WO | 2006/031537 A2 | 3/2006 |
| WO | 2017/223206 A1 | 12/2017 |
| WO | 2020/165868 A1 | 8/2020 |

OTHER PUBLICATIONS

Fan Yilun, "Methods for rapid and high quality acquisition of whole slide images", Aug. 16, 2016, 40 pages, URL: https://doi.org/10.14264/uql.2016.572.

International Search Report for PCT/GB2021/051712 dated Oct. 19, 2021 [PCT/ISA/210].

Written Opinion for PCT/GB2021/051712 dated Oct. 19, 2021 [PCT/ISA/237].

Search Report for GB2011475.7 dated Dec. 24, 2020.

* cited by examiner

WHOLE SLIDE IMAGING METHOD FOR A MICROSCOPE

CROSS REFERENCE TO RELATED APPLICATIONS

This application is a National Stage of International Application No. PCT/GB2021/051712, filed on Jul. 6, 2021, which claims priority from Great Britain Patent Application No. 2011475.7, filed on Jul. 24, 2020.

FIELD OF THE INVENTION

The present invention relates to a method for operating a microscope scanner.

BACKGROUND TO THE INVENTION

A whole slide scanner scans pathology or histopathology samples mounted on a microscope slide in bright-field viewing conditions. The term 'whole slide scanner' is used because the intention is that all of the tissue sample on the slide is scanned. A pre-scan is typically performed of the whole slide to produce a low resolution "pre-scan image". This image is then analysed to identify one or more areas of interest ("AOI") on the target where the sample is thought to be present, and these areas are selectively imaged during a high-resolution imaging scan that follows. Typically, the imaging scan will be performed with a scanning resolution of 2,000-4,000 lpmm (lines per millimetre, wherein each image acquired by a line scanner corresponds to an individual line), or equivalently 51,000-101,000 dpi (dots per inch). The pre-scan will instead be performed at a much lower resolution, typically between 12-61 lpmm (300-1500 dpi). The pre-scan can hence be performed considerably faster (at least an order of magnitude faster) than the imaging scan. Areas of the target outside of the AOI are therefore excluded from the imaging scan to reduce the overall scanning time.

If the tissue is of the order of, or smaller than, the size of the pixel in the pre-scan it does not give good contrast in the resultant pre-scan image. Consequently, the analysis of the pre-scan image to detect the presence of tissue may be unable to detect the tissue. This would result in tissue not being scanned in the high-resolution image. To mitigate this issue higher and higher resolution pre-scan images can be produced to detect even smaller tissue areas. However, as the resolution of the pre-scan images increases, it takes longer to conduct the pre-scan and longer to analyse the pre-scan image to find the tissue regions.

The pre-scan images typically have a large depth of field in comparison to the thickness of the tissue. This is of advantage in that a focus step is not required to perform the scanning of the tissue but has a disadvantage in that defects, such as dust and scratches, on the surface of the slide are also in focus. This forces the AOI detection algorithm to distinguish between the surface defects and the tissue. This discrimination between tissue and defects is not trivial and a compromise has to be found between, time to analyse, how much tissue is missed by the AOI detection algorithm, and how many defects are falsely identified as tissue by the AOI detection algorithm.

It is desirable to ensure that the entire sample is imaged during the imaging scan without significantly compromising the speed or efficiency of the scanning process. The invention is set in the context of solving this problem.

SUMMARY OF THE INVENTION

A first aspect of the invention provides a method for operating a microscope scanner comprising a line scanner, the method comprising:
  generating pre-scan data for a target comprising a sample, wherein generating the pre-scan data comprises:
    obtaining a pre-scan image of the target from a pre-scan; and
    identifying one or more sample-containing regions and one or more sample-free regions of the target from the pre-scan image, wherein the one or more sample-containing regions correspond to locations on the target in which the sample is expected to be present and wherein the one or more sample-free regions correspond to locations on the target where the sample is expected to be absent; and
  performing an imaging scan of a scanning region of the target, the scanning region including the one or more sample-containing regions and the one or more sample-free regions, wherein performing the imaging scan comprises:
    moving the line scanner relative to the target along an image scan path and acquiring an image of the target at each of a plurality of locations along the image scan path using the line scanner; and
    adjusting the scanning speed of the line scanner along the image scan path based on the pre-scan data so that the target is imaged at a higher scanning speed within the one or more sample-free regions than in the one or more sample-containing regions.

The pre-scan data is analysed to determine areas that contain the sample (typically tissue) and areas where the sample is considered to be absent. However, rather than performing the imaging scan only in the areas detected as containing the sample, the "sample-free regions" are also imaged as a precaution since errors can arise from the analysis of the pre-scan data and it is desirable to ensure that all of the sample is imaged. Optionally this may extend to imaging the whole of the target during the imaging scan. The scanning speed is increased in the one or more sample-free regions during the imaging scan, typically leading to a corresponding decrease in the image resolution in these regions. This enables a sample detection algorithm to set the compromise between tissue detection and defect detection so fewer defects are falsely identified as tissue. Furthermore, even if the sample is imaged at a lower resolution within the notionally "sample-free regions" than in the "sample-containing regions" the data that is generated is typically more useful than if the sample-free regions were not imaged at all. The increased scanning speed in the sample-free region(s) ensures that any additional time penalties incurred are minimal.

Performing the imaging scan preferably further comprises: monitoring one or more image parameters from the images of the target acquired along the image scan path; and further adjusting the scanning speed of the line scanner within the one or more sample-free regions in response to a change in said one or more image parameters. By doing so, the scanner may react to the (unexpected) presence of the sample within a "sample-free region". When the sample enters the field of view of the line scanner it will lead to a corresponding change in the one or more image parameters monitored. The scanning speed is adjusted in response to this change, thereby enabling the sample to be imaged at a high resolution during the imaging scan regardless of its location on the target. A higher proportion of the sample on the target can therefore be imaged, which improves the overall usefulness of the scanned image to the microscope user. According to this technique, because the scanning speed may be adjusted on-the-fly in response to a monitored image parameter (typically related to the amount of detail in the image), the spatial resolution of the scan is not predetermined by the scanner at the point that the imaging scan begins.

The one or more image parameters are typically monitored to detect the presence of the sample within the one or more sample-free regions and the scanning speed adjusted so that locations on the target where the sample is detected are imaged at a lower scanning speed than locations on the target where the sample is not detected. This enables a compromise to be met between imaging the entire target at a high resolution (which is desirable for capturing the entire sample but also time-consuming) and imaging only those regions that are identified as containing sample from the pre-scan image. Furthermore, if the sample is detected outside of the sample-containing regions then the scanner reacts to ensure the sample is imaged at a relatively slow speed and thus high resolution wherever present on the target.

Further adjusting the scanning speed based on the pre-scan data preferably comprises: imaging the target at a first target speed within the one or more sample-free regions and imaging the target a second target speed within the one or more sample-containing regions, wherein the first target speed is higher than the second target speed. Further adjusting the scanning speed of the line scanner within the one or more sample-free regions hence preferably comprises reducing the scanning speed from the first target speed in response to a change in said one or more image parameters indicative of the detection of the sample. The sample-free region may hence be imaged at the first target speed only if the monitored one or more image parameters indicate a first criterion (typically the absence of the sample in the image acquired). If the one or more image parameters instead indicate a second criterion (typically the presence of the sample in the image acquired) then the scanning speed is reduced from the first scanning speed to or toward the second target speed. Optionally the sample-containing region may be imaged at the second target speed if the one or more image parameters monitored indicate either the first or the second criterion.

During the imaging scan, the speed of the traverse may be reduced when the pre-scan data indicates that the edge of sample is being approached so that sample is imaged at a high resolution throughout. To avoid sudden decelerations this may occur over a region before the edge of the tissue is reached. The imaging scan may hence further comprise reducing the scanning speed from the first target speed to or towards the second target speed prior to the line scanner transitioning from acquiring images of the sample-free region to acquiring images of the sample-containing region. It is advantageous to arrange the transition between speeds to occur in the region of the target where the sample is absent. The line scanner may then be moved at a constant speed across the sample-containing regions during the imaging scan. This ensures that the sample-containing region is imaged at a uniformly high resolution throughout. The imaging scan may, however, further comprise increasing the scanning speed within the one or more sample-containing regions in response to a change in said one or more image parameters indicative of the absence of the sample in the images acquired. For example, this may occur when an error has been made in identifying the sample-containing regions from the pre-scan data. If the one or more image parameters monitored during the imaging scan suggest that the sample is not contained within the region being imaged, then the scanning speed can be increased to reduce the overall scanning time.

Adjusting the scanning speed typically comprises reducing the scanning speed of the line scanner in response to said one or more image parameters changing in a first predetermined manner with respect to a threshold. For example, the one or more image parameters may change in the first predetermined manner with respect to the threshold in response to an image of the sample being acquired within the sample-free region. Similarly, further adjusting the scanning speed typically comprises increasing the scanning speed of the line scanner in response to said one or more image parameters changing in a second predetermined manner with respect to the threshold. The threshold is preferably predetermined and stored in memory, for example following calibration of the scanner. The one or more image parameters may comprise the brightness of the image, wherein the scanning speed of the line scanner is decreased in response to the brightness of the image decreasing. Similarly, the one or more image parameters may comprise a focus merit value, and wherein the scanning speed of the line scanner is decreased in response to the focus merit value increasing. Typically, a focus merit value is a numerical measure of the degree of complexity within an image, wherein the greater the value the greater the detail in the image. A more in-focus image has a corresponding higher merit value. The imaging scan preferably comprises calculating a focus merit value at each said location along the image scan path and adjusting the focal height of the line scanner along the image scan path based on said focus merit values.

The images are typically acquired at a constant rate in time during the imaging scan throughout the scanning region. Image capture may therefore not be linked to any specific measurand but instead be independently controlled by a timer function. Furthermore, the line scanner is typically moved continuously along the image scan path relative to the target during the imaging scan. The width of each pixel (and hence the overall resolution of the image in a particular region of the target) will therefore generally vary according to the speed at which the line scanner is moving relative to the target at the time the image was captured. Low-resolution images will therefore correspond to images where the line scanner has moved across a greater portion of the target between each successive image capture than high-resolution images. The spatial resolution of the imaging scan will typically not be constant across the image scan path and will depend on the scanning speed for a given location on the target.

It is particularly desirable for the pre-scan to be quick to perform. Focal data for the target may not be available when the pre-scan is performed and so a different camera may be used for the pre-scan, typically having a depth of focus in excess of that of the line scanner. The depth of focus for the pre-scan is preferably in excess of 500 micrometres (optionally at least 1 millimetre) whereas the depth of focus for each image acquired along the imaging path may be below 3 micrometres (and typically 1 micrometre). This typically ensures that the entire sample is positioned within the depth of focus for the pre-scan camera. The pre-scan image is typically obtained from a single pass of the pre-scan camera along a pre-scan imaging path, which may be rectilinear or in raster format. The pre-scan image is typically acquired at a constant spatial resolution across the pre-scan imaging path.

Generating pre-scan data preferably further comprises performing an image analysis of the pre-scan image to produce a probability map indicating the likelihood of the sample being present at each location on the target, wherein the one or more sample-containing regions and the one or more sample-free regions are selected from the probability map. Adjusting the scanning speed of the line scanner along the image scan path based on the pre-scan data may then comprise adjusting the scanning speed according to the likelihood of the sample being present at a given location on the target, as determined from the probability map. The one or more sample-free regions may correspond to locations from the probability map having a low likelihood of containing the sample, and the one or more sample-containing regions may correspond to locations from the probability map having a high likelihood of containing the sample.

In addition to the sample-free and sample-containing regions, one or more other regions of the target may be identified where the probability map is inconclusive on whether the sample is present in this region. For example, generating pre-scan data may further comprise identifying one or more regions of uncertainty on the target from the probability map having a likelihood of containing the sample between that of the sample-free regions and the sample-containing regions. A different scanning speed may be set for this region than in the sample-free and sample-containing regions. For example, adjusting the scanning speed based on the pre-scan data may comprise: imaging the target at a first target speed within the one or more sample-free regions, imaging the target a second target speed within the one or more sample-containing regions, and imaging the target a third target speed within the one or more regions of uncertainty, wherein the third target speed is higher than the second target speed and lower than the first target speed. If the one or more image parameters that are monitored indicate the presence of the sample within the field of view of the line scanner at any point across any of these three regions, the scanning speed may be set to the target speed associated with the sample-containing region (in this case the second target speed).

A high-resolution image of the target is typically generated from a combination of the images acquired during the imaging scan. Generating the high-resolution image preferably comprises increasing the resolution of images acquired at a higher scanning speed using image interpolation to correspond to the resolution of the images acquired at a lower scanning speed. The scanning speed at which each image is captured during the imaging scan is hence typically stored in memory. Generating the high-resolution image may also comprise the adjustment of an interpolation ratio to maintain a constant resolution in the high-resolution image.

The microscope scanner is preferably a bright-field microscope and the imaging scan is preferably performed in a transmission mode for the microscope scanner. The microscope scanner may also be configured to operate in a reflection mode. One or both modes may be used as part of the pre-scan. For example, whereas the transmission mode may be useful in identifying the sample-containing and sample-free regions, the reflection mode may be used to identify opaque regions of the target, such as where a label may be affixed to the target. Opaque regions do not need to be scanned during the imaging scan and so the scanning region is preferably selected from the pre-scan image so as to substantially cover the entire target, excluding any opaque regions of the target.

A second aspect of the invention provides a computer program product containing instructions which, when executed using a microscope scanner comprising a line scanner and a target comprising a sample, causes the microscope scanner to perform the method of the first aspect. The second aspect shares similar features and advantages as discussed in connection with the first aspect.

The microscope scanner is preferably a virtual microscope, and the computer program product typically corresponds to a non-transient computer-readable medium, such as a hard drive. The target may take a number of forms however preferably the target comprises a biological tissue sample. The target preferably shows no substantial variation in surface height and so is essentially flat for the purposes of the pre-scan, which typically has a large depth of focus. For example, the target could be a stained tissue extract that has been sliced and retained between flat glass slides. The focus of the line scanner may be adjusted during the high-resolution imaging scan because the surface height of the target may vary by an amount exceeding the depth of focus used in the imaging scan.

BRIEF DESCRIPTION OF THE DRAWINGS

Embodiments of the invention will now be discussed with reference to the following illustrations in which.

DETAILED DESCRIPTION

Figure 1:
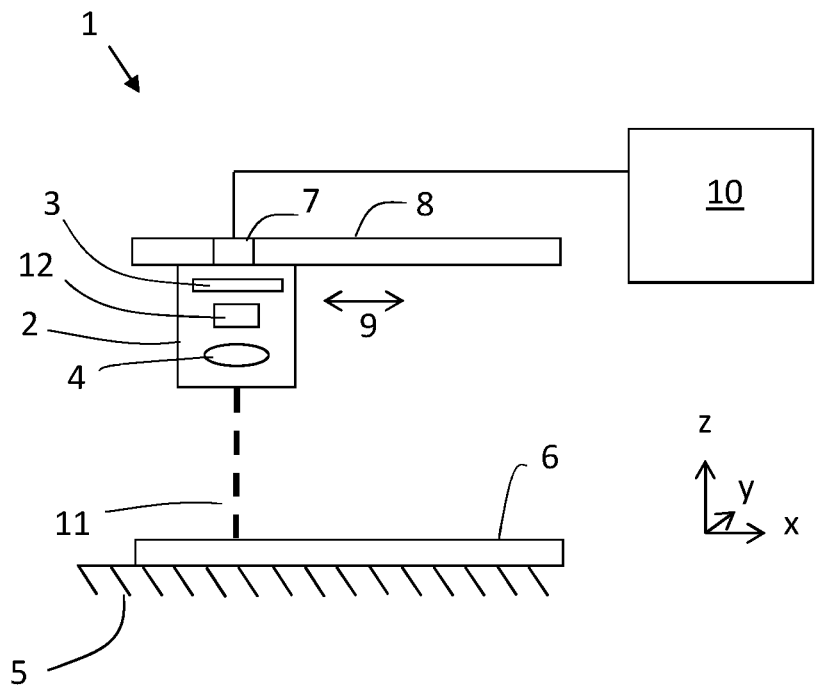
FIG. 1 is a schematic illustration of a microscope scanner to be operated in accordance with a first embodiment of the invention.
Figure 2:
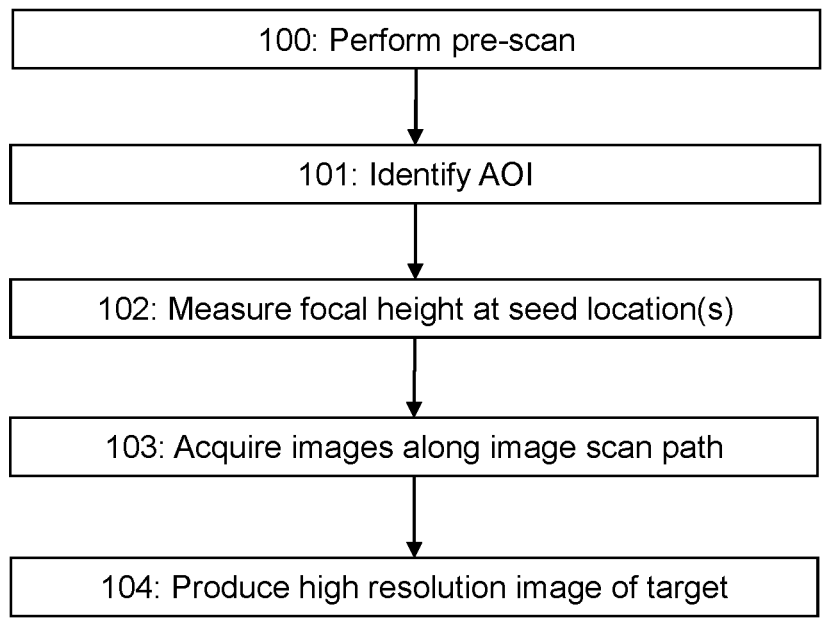
FIG. 2 is a flowchart indicating a process according to the first embodiment of the invention.

An example of a bright-field microscope scanner 1 is shown in FIG. 1. This comprises a scan head 2 comprising a line scanner 3 in the form of a linear photo-detector array. The scan head 2 further comprises an adjustable focus system 4 and a pre-scan camera 12. A platen 5 is provided upon which is positioned a target 6 in the form of a pathology slide containing a tissue sample. A drive mechanism 7 attaches the scan head 2 to a track 8 such that the scan head can be moved with respect to the target 6 as indicated by the arrows 9. The track 8 can also allow the scan head 2 to be displaced laterally for imaging adjacent swathes. The microscope scanner 1 is controlled using an electronic controller in the form of a computer system 10. Coordinate axes are also provided in FIG. 1 for reference to in the following example. The ordinate z-axis is aligned with the optical axis of the scan head 2 and the focal height of the target 6, whereas the abscissa x-axis represents the scan direction (parallel to the arrow 9 in FIG. 1). The surface of the target 6 is aligned in the xy plane and a lens of the adjustable focus system 4 is moveable along the z-axis. In an alternative example, the scan head 2 remains stationary and the target 6 is moved in the xy plane in order to achieve relative motion between the scan head 2 and the target 6 during the scanning processes. The pre-scan camera 12 may also form a separate unit from the scan head 2 and operable independently of the scan head 2. The pre-scan camera 12 may comprise a line scanner however the selection is not especially relevant provided that a two-dimensional pre-scan image can be acquired of the whole slide using the pre-scan camera 12. In contrast, a line scanner 3 must be used in the imaging scan that follows the pre-scan. TDI sensors are not suitable for the imaging scan nor are 2D sensors operating in a 2D imaging mode due to a need to alter the spatial resolution during the imaging scan, as will later be discussed. An example of a suitable microscope scanner 1 is the VENTANA DP200 provided by Roche Diagnostics.

The operation of the microscope scanner 1 in performing a method according to a first embodiment of the invention will now be described with reference to FIGS. 1 to 9. The method begins at step 100 (FIG. 2) where a pre-scan is performed to generated pre-scan data, including a pre-scan image of the target 6. The scan head 2 is traversed along the track 8 with images of the target 6 being acquired using the pre-scan camera 12 in a single pass along a pre-scan imaging path. The pre-scan camera 12 is configured to acquire images of the target at a depth of focus of 1 mm, which is significantly higher than the thickness of the sample (typically between 2 to 10 µm). The focal height of the pre-scan camera 12 is therefore not adjusted during the pre-scan and the pre-scan image is rapidly produced at a relatively low resolution, for example at 1200 dpi (47 lines per mm). The pre-scan image provides an overview of the outline of the sample on the target 6 from which one or more areas of interest, AOI, can be selected for imaging during a first imaging scan.

Figure 3:
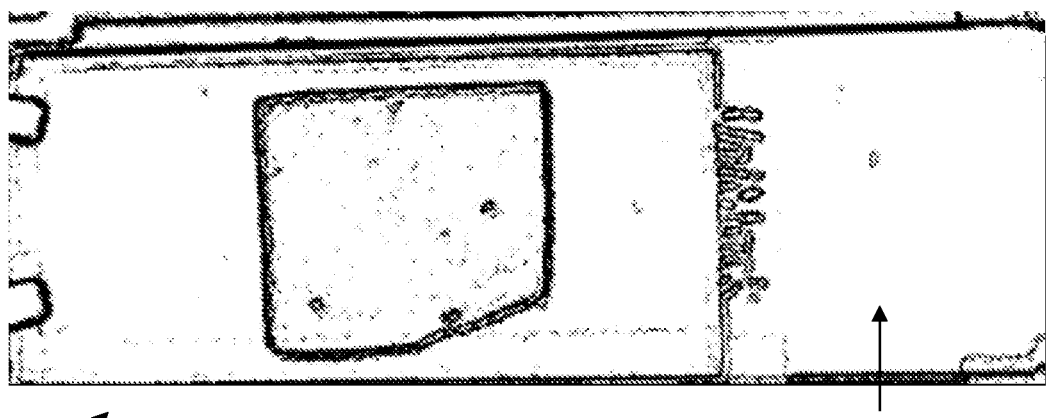
FIG. 3 is an example of a pre-scan image acquired in accordance with the first embodiment of the invention.
Figure 4:
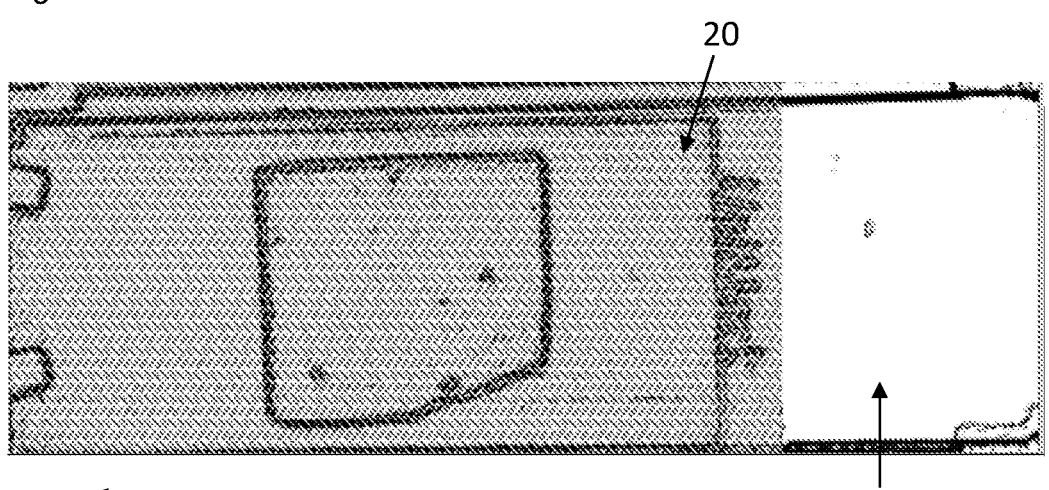
FIG. 4 is an example of a pre-scan image acquired in accordance with the first embodiment of the invention with the scanning region identified.

An example of a pre-scan image is shown by FIG. 3. An opaque region of the target 6 is identifiable to the right side where a label 22 is affixed to the slide. This region is identified by operating the microscope scanner 1 in a transmission mode and a reflection mode during the pre-scan, and comparing the resultant images, as known in the art. The remaining (optically transmissive) portion of the target 6 is selected by the computer system 10 as a scanning region 20 across which an imaging scan will be performed. This scanning region 20 is identified by the herringbone pattern overlaid to the pre-scan image in FIG. 4.

Figure 5:
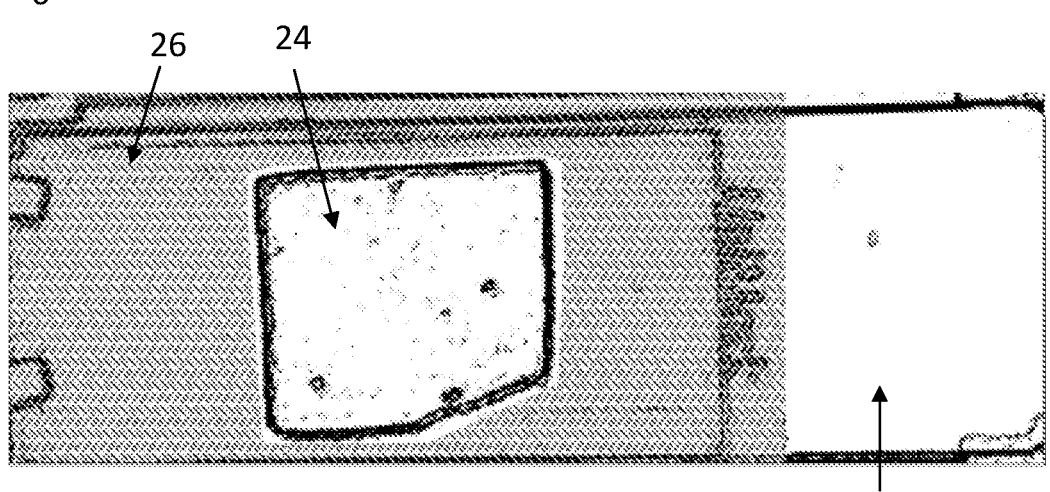
FIG. 5 is an example of a pre-scan image acquired in accordance with the first embodiment of the invention with the sample-free region and sample-containing region identified.

The pre-scan image is processed at step 101 using conventional software so that each region in which the sample is visible in the pre-scan image is identified as an AOI, also referred to herein as a "sample-containing region". More specifically, an automated image analysis of the pre-scan image is used to produce a probability map indicating where the sample is expected to be present on the target, with the one or more AOI being selected from the probability map. Typically, the boundaries of the AOI may be selected so as to lie just outside the outer edges of the sample (as identified from the pre-scan image) so that the sample is fully contained within the AOI. The pre-scan image may then be displayed to a user using the computer system 10 with the one or more AOI demarcated. Optionally the user may then manually adjust the boundaries of the one or more AOI using the computer system if desired. For illustration purposes, FIG. 5 shows the pre-scan image of FIGS. 3 and 4 but the herringbone pattern has not been overlaid across the sample-containing region 24 identified from the pre-scan image. The remaining portion of the scanning region 20 (outside of the sample-containing region 24), and across which the herringbone pattern extends, is referred to herein as the "sample-free region" 26.

The imaging scan progresses at a much slower speed in comparison with the pre-scan and so it is desirable to only image those areas on the target 6 where the sample is present during the imaging scan. Typically, the imaging scan would therefore be performed across the one or more AOI identified from the pre-scan data only. However, the resolution of the pre-scan image is relatively low and errors in the AOI detection process can occur. Portions of the sample can therefore be inadvertently excluded from the one or more AOI identified. These regions would therefore fail to be imaged during the imaging scan, which is undesirable. If the imaging scan were instead performed uniformly across the entire scanning region then the overall scanning time would be very long and a large amount of data would be generated, which is slow to process. A compromise is therefore made in which the entire scanning region 20 is imaged during the imaging scan, however the target scanning speed is faster within the sample-free region 26 than in the sample-containing region 24.

At step 102 of the method a seed location is selected in the xy plane within the sample-containing region 24 (typically at the edge of the sample-containing region 24 in the AOI) and the focal height of the sample measured at that location using the line scanner 3. The focal height of the adjustable focus system 4 is varied through a predefined range of focal heights so as to obtain image information from the target 6 at a number of different focal positions along the z-axis with a depth of focus to around 1 µm. An in-focus position is then calculated from the image information at each focal position through the use of a focus parameter in the form of a focus merit value. Typically, a focus merit value is a numerical measure of the degree of complexity within an image, wherein the greater the value the greater the detail in the image. A more in-focus image has a corresponding higher merit value. The focal height having the highest merit value is then stored as the measured in-focus position for the seed location and the process repeated for any remaining seed locations identified.

An image scan path is calculated across which the scan head 2 will be moved so that the line scanner 3 images the entire scanning region 20 (including the sample-containing region 24 and sample-free region 26). The line scanner 3 is then moved to a starting location within the sample-free region 26 and the focal height is set according to the focal height recorded for the in-focus position for the seed location. For example, the focal height at the starting location may be the same as the focal height for the in-focus position at the seed location, or it may be based on an extrapolation of this position.

The purpose of acquiring images of the sample-free region 26 during the imaging scan is that, if a portion of the sample is located in the sample-free region 26 (and which was therefore undetected by the analysis of the pre-scan image), then it can be imaged. It is desirable, however, that any images of the sample are acquired at a resolution that is similar or equal to the resolution of the images acquired within the sample-containing region 24. According to the first embodiment, one or more image parameters are therefore monitored by the computer system 10 for each image acquired along the image scan path. The image parameters monitored will typically change above or below a threshold each time the sample enters or exits the field of view of the line scanner 3. For example, the focus merit value or the frequency content may be monitored at each location, and this will typically rise above a predetermined threshold each time the sample enters the field of view. Alternatively, or additionally, the brightness of the image may be monitored, wherein a drop in the brightness below a brightness threshold (for example, 90-95% of the maximum brightness) is indicative of a sample entering the field of view of the line scanner 3. Clear slide will have a given brightness value with a fixed noise or minimal high-frequency response. If the brightness decreases below the brightness threshold or the noise or high-frequency value increases above a corresponding threshold, there may be tissue present and the scanning speed can be reduced to increase the scanning resolution. Typically, this would be over a region to eliminate sudden accelerations. This way tissue not detected in the pre-scan image may be scanned at a high resolution. Once the tissue was no longer detected the traverse speed can be increased again to reduce the scanning time.

The imaging scan commences at step 103, at which point the scan head 2 is moved from the starting location across the image scan path and images are obtained of a plurality of adjacent locations on the target 6. The image scan path is calculated such that the line scanner 3 moves at a first target speed within the sample-free region 26 and a second target speed within the sample-containing region 24, the first target speed being faster than the second target speed. The spatial resolution of the traverse scanning can be altered by increasing the scanning speed (also referred to as the "traverse speed"). If the scan resolution within the sample-containing region 24 is set to 4000 by 4000 lpmm then by increasing the speed of the traverse the scan resolution is changed to 4000 by y lpmm where y may be a number between 4000 and 1000 lpmm or even lower. As the sample-free region 26 typically only contains a clear slide, it is not important to scan this region at high resolution. As such if the scan resolution was selected at 1000 lpmm then the sample-free region 26 may be scanned at 4 times the speed sample-containing region 24. The starting position for the imaging scan is within the sample-free region 26 and so the line scanner 3 is initially moved at the first target speed. However, if a change in the one or more image parameters is monitored indicative of the sample entering the field of view of the line scanner 3 within the sample-free region 26, then the scanning speed is reduced to the second target speed. On-the-fly detection of the sample can therefore occur and the sample is imaged at a high resolution wherever it is present on the target 6.

Figure 6:
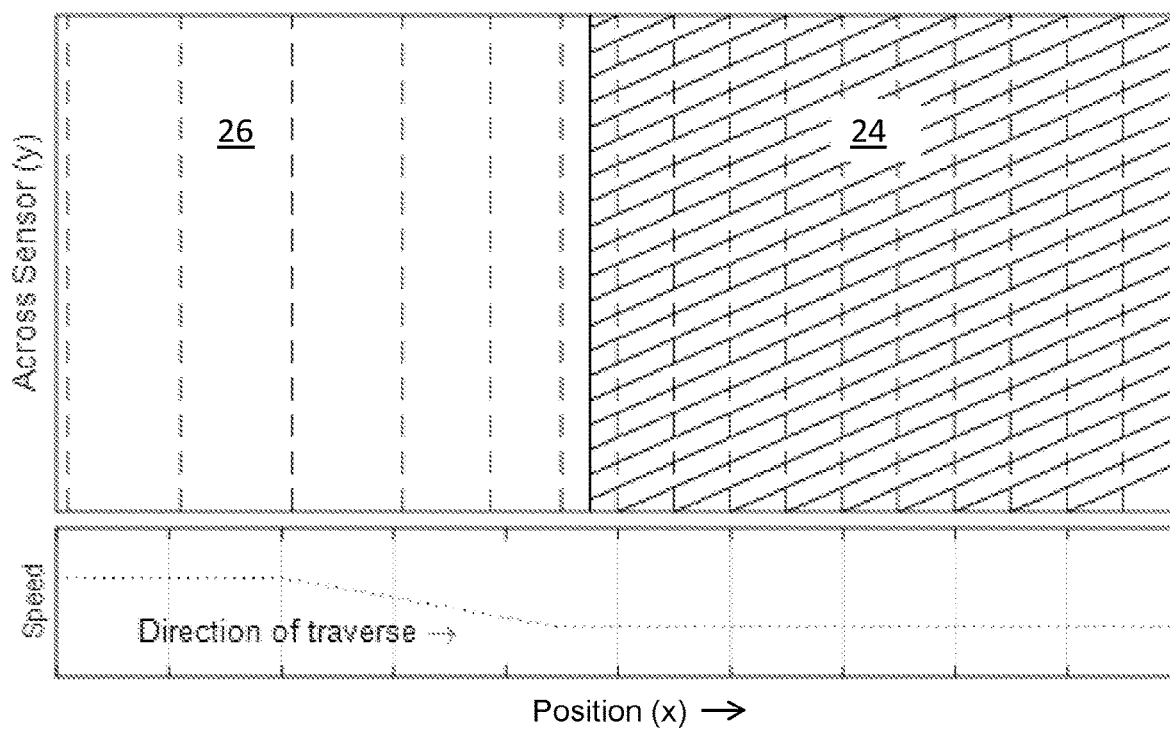
FIG. 6 is a graph illustrating a change in the scanning speed when transitioning from the sample-free region to the sample-containing region according to the first embodiment of the invention.
Figure 7:
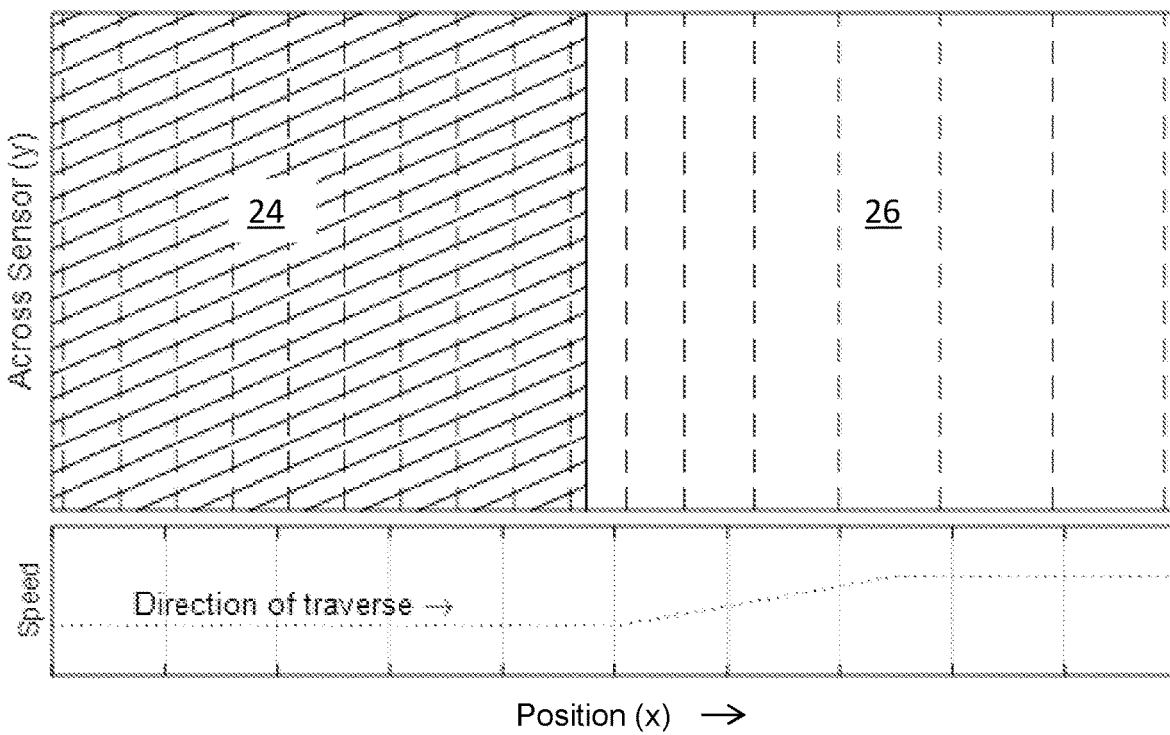
FIG. 7 is a graph illustrating a change in the scanning speed when transitioning from the sample-containing region to the sample-free region according to the first embodiment of the invention.

When the pre-scan data indicates that the edge of the sample is being approached in the imaging scan then the scanning speed can be reduced such that the edge of the sample is captured at high resolution. This is illustrated by FIG. 6, in which the upper-most graph indicates two areas of the target 6: the clear portion to the left designates the sample-free region 26, whereas the shaded region marked designates the sample-containing region 24. The lower-most graph in FIG. 6 shows the change in the scanning speed as the line scanner 3 transitions from imaging the sample-free region 26 to the sample-containing region 24. The image scan path is calculated such that the scanning speed is gradually reduced from the first target speed to the second target speed prior to the line scanner 3 moving from imaging the sample-free region 26 to imaging the sample-containing region 24. In this example the second target speed is half that of the first target speed. The first images of the target-containing region 24 are then obtained at the second target speed, without any sudden decelerations occurring inside this region. Similarly, once the pre-scan data indicates that the edge of sample-containing region 24 has passed, the scanning speed is increased back to the first target speed, as illustrated by FIG. 7. This increase in speed occurs over a region to reduce the rate of acceleration and produce a smooth transition between the different areas. There will be a maximum acceleration/deceleration and a maximum rate of change of acceleration. Taking an example in which the target 6 is moved during the imaging scan and the line scanner 3 held stationary, to change a 5 kg stage and slide from the velocity required for a 1000 lpmm scan to a 4000 lpmm scan may only require 3 J but to do this in a single line time would require 85 W. Spread over 10 lines the same energy is required but the power reduces to 8.5 W.

The vertical dashed lines in the upper-most graphs of FIGS. 6 and 7 indicate where image capture is triggered. The line scanner 3 acquires images at a constant rate throughout the imaging scan. The spatial density of the sampling points (i.e. the locations at which image capture is triggered) therefore increases as the scanning speed decreases from the first target speed to the second target speed (FIG. 6), and then decreases as the scanning speed is increased from the second target speed to the first target speed (FIG. 7). Absent of any interpolation, this change in scanning speed will lead to a corresponding change in the image resolution between the sample-free region 26 and the sample-containing region 24, as will later be discussed with reference to FIG. 9.

In the first embodiment, the scanning speed is held constant at the second target speed throughout the sample-containing region 24. However, in other embodiments the scanning speed may be increased if the one or more image parameters monitored indicate that the sample is not located within the sample-containing region 24. This could occur, for example, if the AOI detection algorithm incorrectly identified a surface marking on the target 6 as a portion of the sample. The depth of focus of the line scanner 3 is typically below 3 micrometers, meaning that surface markings are unlikely to be identified as being the sample within the imaging scan. Optionally, the scanning speed may only be increased from the second target speed within the sample-containing region 24 if the sample is not detected within a threshold distance (or equivalently after a threshold number of lines have been acquired). The scanning speed may then be increased from the second scanning speed to the first scanning speed, or optionally to a value between these two values. For example, the increase in the scanning speed may be balanced by the probability of the sample being present in a given location or region, as determined by the probability map. That is, if the pre-scan analysis gives a good certainty of the presence of the sample then the scanning speed would not be increased because it is expected that the sample will be imaged within the sample-containing region 24 and it is desirable to image this at the highest resolution once reached. If, however, the probability map indicates a relatively low certainty of the sample being present at a given position within the area marked as the sample-containing region" (i.e. the pre-scan analysis was uncertain on the presence of sample in that region), the scanning speed could be increased by a scaling factor. For example, if the certainty of the sample being present in a given location was only 50% then the scanning speed would be increased by only 50% of the possible increase in the scanning speed.

In a further embodiment the scanning speed is continually adjusted during the imaging scan as a proportion of the certainty of finding sample at a given location, as determined from the probability map generated from the pre-scan data. Alternatively, if a threshold brightness of 95% is set to be indicative of a clear slide (for which the resolution is set at 1000 lpmm) and a second threshold of 90% brightness is indicative of the presence of a sample (for which the resolution is set at 4000 lpmm), then a linear ramp could be used to set the speed for brightness values between this range. For example, if the brightness is measured to be 92.5% then the scanning speed may be set to produce a resolution of 2500 lpmm.

Figure 8:
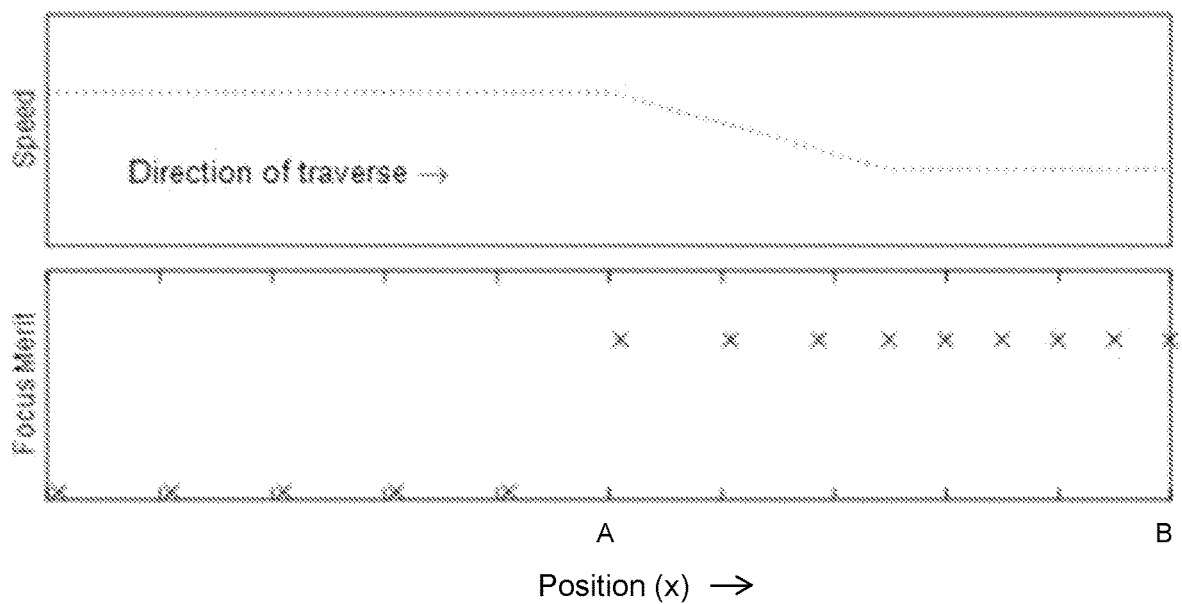
FIG. 8 is a graph illustrating a change in the scanning speed when detecting the presence of the sample inside the sample-free region according to the first embodiment of the invention.

Returning to the first embodiment, once the line scanner 3 progresses from acquiring images of the sample-containing region 24 to again acquiring images of the sample-free region 26 the scanning speed is increased to the first target speed (as shown by FIG. 7). If there is a change in the one or more image parameters monitored indicative of the presence of the sample within the field of view of the line scanner 3 then the scanning speed is again reduced to the second target speed so that the sample is imaged at a suitably high resolution. This way, if part of the sample is not detected by analysis of the pre-scan data, then a high-resolution image will still be acquired of it. FIG. 8 illustrates such an example in which a portion of the sample is detected within the sample-free region 26. The upper-most graph shows the scanning speed as the line scanner 3 moves along the image scan path. An image parameter in the form of a focus merit value is calculated from each image acquired along the image scan path. The focus merit value for each image or 'line' is marked with an 'x' in the lower-most graph in FIG. 8 at the corresponding position along the image scan path. The scanning speed is held at the first target speed for successive image captures where the focus merit value is below the focus merit value threshold. At a position marked 'A' the focus merit value increases above the threshold, indicating that a portion of the sample is visible within the image for that position (inside the sample-free region 26). In response to this change in the focus merit value, the scanning speed is reduced from the first target speed to the second target speed. The line scanner 3 is decelerated over the subsequent three lines until the second target speed is reached. The focus merit value is approximately constant throughout a portion of the image scan path extending from position A to position B, indicating that the sample extends across this region. The detection of the sample within the so-called sample-free region shows how an analysis of the pre-scan data alone can provide inaccurate results and why it is therefore useful to acquire images of the sample-free region 26 as well as the sample-containing region 26. Although in the first embodiment the scanning speed is adjusted on-the-fly in response to a change in a monitored image parameter, in alternative embodiments the scanning speed may be set based on the analysis of the pre-scan data alone, with sample-containing regions being imaged at a slower speed than sample-free regions.

Throughout the imaging scan, an estimated in-focus level may be calculated using techniques known in the art, such as described in U.S. Pat. No. 9,116,035 B2. Where the sample is within the field of view of the line scanner 3, the focal height of the line scanner 3 is adjusted between each xy location along the image scan path in the direction of or to the estimated in-focus position. The target 6 is imaged in one or more swathes in this manner, following a serpentine or raster image scan path, until the scanning region has been imaged entirely.

At step 104, the individual images acquired by the line scanner 3 are combined together to form a high-resolution image of the target. It is desirable that the viewing resolution of the output image is uniform for both high-speed scanning areas and low-speed scanning areas. The resolution of the image in the areas scanned at a higher scanning speed may be increased by the use of interpolation techniques such as bi-cubic interpolation or other image processing techniques known in the art (for instance as described in Chapter 3 of Numerical Recipes in C: the Art of Scientific Computing; Cambridge University Press; 1992). Thus, it is possible to scan at a lower resolution but generate what appears to be a high-resolution image. The interpolation ratio will be suitably adjusted in step 104 according to the scanning speed at which the images were acquired to maintain a constant resolution in the output high-resolution image. This is discussed further below with reference to FIG. 9.

Figure 9:
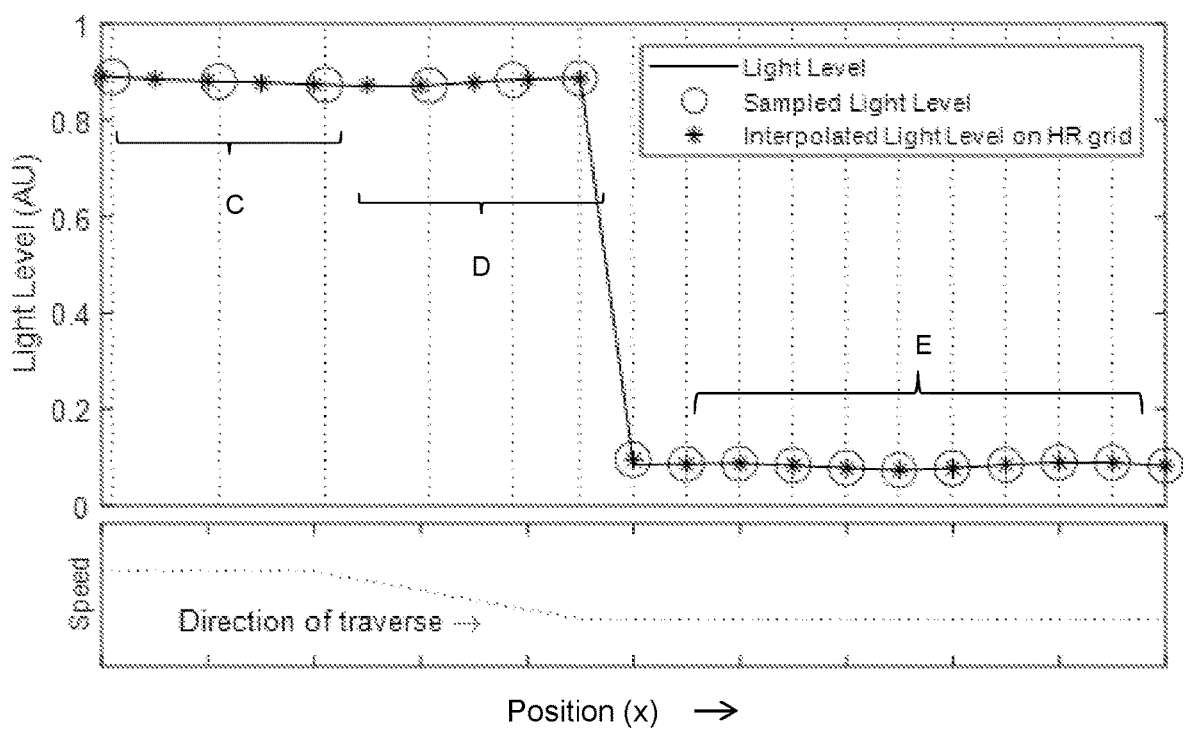
FIG. 9 is a graph illustrating the interpolation of data when generating a high-resolution image of the target according to the first embodiment of the invention.

FIG. 9 shows the process from FIG. 6 however in this case the upper-most graph shows the amount of light incident on the line scanner 3. The light level is initially high (approximately 0.9 on the normalised scale shown) and approximately constant across the region of the target 6 in which the sample is not present. The light level then decreases to below 0.1 when the sample enters the field of view of the line scanner 3 (inside the sample-containing region 24). The light level is monitored from the images captured along the image scan path and the position of the sampling points marked with circles. The spatial separation between the adjacent sampling points is approximately twice that within the region marked 'C' (within the sample-free region 26) than in the region marked 'E' (within the sample-containing region 24). The region marked 'D' shows the region where the scanning speed is ramped down between the first target speed and the second target speed. In the performance of step 104, the image data from the line scanner 3 is interpolated onto a nominal HR grid so that image data is generated at a constant resolution across the image scan path. The interpolated data is marked with stars within the upper-most graph. As can be seen, image data is interpolated between adjacent sampling points for regions C and D. The high-resolution image produced by the imaging scan may then be displayed to a user by the computing system 10 for sample analysis.

An improved method for operating a microscope scanner is therefore provided which ensures the entire sample is imaged at a high resolution and without unduly increasing the overall scanning time.

The invention claimed is:
1. A method for operating a microscope scanner comprising a line scanner, the method comprising:
generating pre-scan data for a target comprising a sample, wherein generating the pre-scan data comprises:
obtaining a pre-scan image of the target from a pre-scan; and
identifying one or more sample-containing regions and one or more sample-free regions of the target from the pre-scan image, wherein the one or more sample-containing regions correspond to locations on the target in which the sample is expected to be present and wherein the one or more sample-free regions correspond to locations on the target where the sample is expected to be absent; and performing an imaging scan of a scanning region of the target, the scanning region including the one or more sample-containing regions and the one or more sample-free regions, wherein performing the imaging scan comprises:
  moving the line scanner relative to the target along an image scan path and acquiring an image of the target at each of a plurality of locations along the image scan path using the line scanner;
  adjusting the scanning speed of the line scanner along the image scan path based on the pre-scan data so that the target is imaged at a higher scanning speed within the one or more sample-free regions than in the one or more sample-containing regions;
  monitoring one or more image parameters from the images of the target acquired along the image scan path; and
  further adjusting the scanning speed of the line scanner within the one or more sample-free regions in response to a change in said one or more image parameters.

2. A method according to claim 1, wherein adjusting the scanning speed based on the pre-scan data comprises: imaging the target at a first target speed within the one or more sample-free regions and imaging the target at a second target speed within the one or more sample-containing regions, wherein the first target speed is higher than the second target speed; and
  wherein the imaging scan further comprises reducing the scanning speed from the first target speed to or towards the second target speed prior to the line scanner transitioning from acquiring images of the sample-free region to acquiring images of the sample-containing region.

3. A method according to claim 1, wherein the one or more image parameters monitored comprise a focus merit value.

4. A method according to claim 3, wherein the scanning speed of the line scanner is decreased in response to the focus merit value increasing.

5. A method according to claim 1, wherein said one or more image parameters are monitored to detect the presence of the sample within the one or more sample-free regions, wherein the scanning speed is further adjusted so that locations on the target where the sample is detected are imaged at a lower scanning speed than locations on the target where the sample is not detected.

6. A method according to claim 1, wherein adjusting the scanning speed based on the pre-scan data comprises: imaging the target at a first target speed within the one or more sample-free regions and imaging the target at a second target speed within the one or more sample-containing regions, wherein the first target speed is higher than the second target speed; and
  wherein further adjusting the scanning speed of the line scanner within the one or more sample-free regions comprises: reducing the scanning speed from the first target speed in response to a change in said one or more image parameters indicative of the detection of the sample.

7. A method according to claim 1, wherein the imaging scan further comprises increasing the scanning speed within the one or more sample-containing regions in response to a change in said one or more image parameters indicative of the absence of the sample in the images acquired.

8. A method according to claim 1, wherein the one or more image parameters comprise the brightness of the image, and wherein the scanning speed of the line scanner is decreased in response to the brightness of the image decreasing.

9. A method according to claim 1, wherein the imaging scan further comprises calculating a focus merit value at each said location along the image scan path and adjusting the focal height of the line scanner along the image scan path based on said focus merit values.

10. A method according to claim 1, wherein the images are acquired at a constant rate in time during the imaging scan, wherein the line scanner is moved continuously along the image scan path relative to the target during the imaging scan and at a constant speed across the sample-containing regions during the imaging scan.

11. A method according to claim 1, wherein the imaging scan is performed in a transmission mode for a bright-field microscope.

12. A method according to claim 1, further comprising selecting the scanning region from the pre-scan image so as to substantially cover the entire target, preferably excluding any opaque regions of the target.

13. A non-transitory computer readable medium containing instructions which, when executed using a microscope scanner comprising a line scanner and a target comprising a sample, causes the microscope scanner to perform the method of claim 1.

14. A microscope scanner comprising:
  a line scanner;
  a computer readable memory containing instructions; and
  a processor configured to execute the instructions contained in the memory, which, when executed, perform the method of claim 1.

15. A method for operating a microscope scanner comprising a line scanner, the method comprising:
  generating pre-scan data for a target comprising a sample, wherein generating the pre-scan data comprises:
    obtaining a pre-scan image of the target from a pre-scan; and
    identifying one or more sample-containing regions and one or more sample-free regions of the target from the pre-scan image, wherein the one or more sample-containing regions correspond to locations on the target in which the sample is expected to be present and wherein the one or more sample-free regions correspond to locations on the target where the sample is expected to be absent; and
  performing an imaging scan of a scanning region of the target, the scanning region including the one or more sample-containing regions and the one or more sample-free regions, wherein performing the imaging scan comprises:
    moving the line scanner relative to the target along an image scan path and acquiring an image of the target at each of a plurality of locations along the image scan path using the line scanner; and
    adjusting the scanning speed of the line scanner along the image scan path based on the pre-scan data so that the target is imaged at a higher scanning speed within the one or more sample-free regions than in the one or more sample-containing regions;
  wherein the depth of focus for the pre-scan is in excess of 500 micrometres and wherein the depth of focus for each image acquired along the imaging path is below 3 micrometres.

16. A method for operating a microscope scanner comprising a line scanner, the method comprising:
- generating pre-scan data for a target comprising a sample, wherein generating the pre-scan data comprises:
  - obtaining a pre-scan image of the target from a pre-scan; and
  - identifying one or more sample-containing regions and one or more sample-free regions of the target from the pre-scan image, wherein the one or more sample-containing regions correspond to locations on the target in which the sample is expected to be present and wherein the one or more sample-free regions correspond to locations on the target where the sample is expected to be absent; and
- performing an imaging scan of a scanning region of the target, the scanning region including the one or more sample-containing regions and the one or more sample-free regions, wherein performing the imaging scan comprises:
  - moving the line scanner relative to the target along an image scan path and acquiring an image of the target at each of a plurality of locations along the image scan path using the line scanner; and
  - adjusting the scanning speed of the line scanner along the image scan path based on the pre-scan data so that the target is imaged at a higher scanning speed within the one or more sample-free regions than in the one or more sample-containing regions;
- wherein generating pre-scan data further comprises performing an image analysis of the pre-scan image to produce a probability map indicating the likelihood of the sample being present at each location on the target, wherein the one or more sample-containing regions and the one or more sample-free regions are selected from the probability map.

17. A method according to claim 16, wherein adjusting the scanning speed of the line scanner along the image scan path based on the pre-scan data comprises adjusting the scanning speed according to the likelihood of the sample being present at a given location on the target as determined by the probability map.

18. A method according to claim 17, wherein the one or more sample-free regions correspond to locations from the probability map having a low likelihood of containing the sample, wherein the one or more sample-containing regions correspond to locations from the probability map having a high likelihood of containing the sample, and wherein generating pre-scan data further comprises identifying one or more regions of uncertainty on the target from the probability map having a likelihood of containing the sample between that of the sample-free regions and the sample-containing regions.

19. A method according to claim 18, wherein adjusting the scanning speed based on the pre-scan data comprises: imaging the target at a first target speed within the one or more sample-free regions, imaging the target at a second target speed within the one or more sample-containing regions, and imaging the target a third target speed within the one or more regions of uncertainty, wherein the third target speed is higher than the second target speed and lower than the first target speed.

20. A method for operating a microscope scanner comprising a line scanner, the method comprising:
- generating pre-scan data for a target comprising a sample, wherein generating the pre-scan data comprises:
  - obtaining a pre-scan image of the target from a pre-scan; and
  - identifying one or more sample-containing regions and one or more sample-free regions of the target from the pre-scan image, wherein the one or more sample-containing regions correspond to locations on the target in which the sample is expected to be present and wherein the one or more sample-free regions correspond to locations on the target where the sample is expected to be absent; and
- performing an imaging scan of a scanning region of the target, the scanning region including the one or more sample-containing regions and the one or more sample-free regions, wherein performing the imaging scan comprises:
  - moving the line scanner relative to the target along an image scan path and acquiring an image of the target at each of a plurality of locations along the image scan path using the line scanner; and
  - adjusting the scanning speed of the line scanner along the image scan path based on the pre-scan data so that the target is imaged at a higher scanning speed within the one or more sample-free regions than in the one or more sample-containing regions; and
- generating a high-resolution image of the target from a combination of the images acquired during the imaging scan, wherein generating the high-resolution image comprises increasing the resolution of images acquired at a higher scanning speed using image interpolation to correspond to the resolution of the images acquired at a lower scanning speed.

21. A method according to claim 20, wherein generating the high-resolution image comprises adjusting an interpolation ratio to maintain a constant resolution in the high-resolution image.

* * * * *